April 26, 1966     H. E. KASTING ETAL     3,248,042
THERMOPLASTIC BAG

Filed Dec. 26, 1962     3 Sheets-Sheet 1

INVENTORS
EDWARD M. GADOMSKI
HOWARD E. KASTING
JOHN P. SACHS
BY
ATTORNEY

INVENTORS
EDWARD M. GADOMSKI
HOWARD E. KASTING
JOHN P. SACHS
BY John J. Hohmann
ATTORNEY

INVENTOR.
EDWARD M. GADOMSKI
HOWARD E. KASTING
JOHN P. SACHS
BY
ATTORNEY

United States Patent Office 3,248,042
Patented Apr. 26, 1966

3,248,042
THERMOPLASTIC BAG
Howard E. Kasting, Park Forest, Ill., John P. Sachs, Stamford, Conn., and Edward M. Gadomski, Oak Lawn, Ill., assignors to Union Carbide Corporation, a corporation of New York
Filed Dec. 26, 1962, Ser. No. 246,962
2 Claims. (Cl. 229—57)

The invention relates to bags made of heat-sealable thermoplastic film, and to methods of making such bags.

A bag is a receptacle of flexible material, usually a tube closed at one end and either open-mouthed or partly or wholly closed at the other end. Making end closures to a tube requires the making of joints. A generally preferred way to join film of thermoplastic resin is by heat-sealing under carefully controlled pressure, temperature, and time conditions. Joints properly so formed are very resistant to rupture by forces acting in shear through the joint, but considerably less resistant to rupture by forces acting to peel apart the joined film.

In the manufacture of bags from heat-sealable thermoplastic film it is desirable, and particularly so in the case of industrial bags made of heavy-gauge film expected to withstand rough handling, to form all joints by heat-sealing, the seals being of high strength and so located that during handling and use of the bags the stresses on the joints are exerted in shear rather than as a peeling force, i.e., lap-joint seals rather than face-to-face or pinch seals.

Tensile tests have demonstrated that relative strength of heat seals in thermoplastic films made in a "lapped" construction, wherein stresses are transmitted in shear, are at least twenty times stronger than heat seals made in a "face-to-face" construction, wherein stresses are made to peel apart the film plies. Optimum heat seal strength is obtained in lapped joints of polyolefin films, such as polyethylene, when optimum temperature and sealing pressure are uniformly transmitted along the extent of the seal area and are maintained for an optimum sealing time interval.

Because heat-sealing of thermoplastic films to make joints of optimum strength requires the use of two opposed surfaces, one heated and one usually unheated, between which the films are pressed, it is a difficult and cumbersome operation to form lap-seals for bag closures with one sealer surface inside the bag and one outside, and such an operation is not readily adapted to automatic bag-making by machine.

Older industrial bags of thermoplastic film material were made with closures having a single "face-to-face" or peel-type heat seal. Such bags were expanded to a pillow-shaped article when filled by the packaged commodity. The disadvantages of such a bag are that the volume of the contents is relatively small, the end closures are weak, and the bottom when filled is not a flat surface so that the bag does not readily maintain itself in an upright position. Also, it is often difficult to stack such bags because of the pillow shape.

In accordance with this invention, heat-seals are made from bag blanks of novel configurations, by a novel method in which the sealing elements may at all times be outside the main body of the bag blanks, producing novel bags of improved characteristics.

The invention will be more particularly described with reference to the accompanying drawings, in which:

FIG. 1 is a front elevation of a novel bag blank comprising a flattened tube 10 having side flaps 11 and 12 and end tabs 13 and 14, each having a tongue A and A', formed at at least one end of the tube;

FIG. 2 is a top view of the bag blank of FIG. 1, supported on a split platen 15, showing the side flaps 11 and 12 outfolded, the end tabs 13 and 14 infolded, and heat-seals 16, 17, 18, and 19 between the end tabs and the side walls of the bag;

FIG. 3 is a top view of the bag blank of FIG. 2, showing the tongue ends A and A' of the end tabs 13 and 14 outfolded;

FIG. 4 is a top view of the bag blank of FIG. 3, showing the side flaps 11 and 12 infolded, heat-seals 21 and 22 joining the side flaps 11 and 12 to each other, and heat-seals 23, 24, 25, and 26 joining the outfolded portions A and A' of the end tabs 13 and 14 to the side flaps 11 and 12;

FIG. 5 is an isometric view of a completed bag, having two closed ends, showing at the top end the structure illustrated in FIG. 4;

FIG. 6 is a front elevation of a modified bag blank comprising a flattened tube 30 having side flaps 34, 35 and end tabs 36, 37 formed by cut out portions 31, 31' and slits 32, 32' and 33, 33';

FIG. 7 is a top view of the bag blank of FIG. 6 supported on a split platen 15, showing the side flaps 34, 35 outfolded and the end tabs 36, 37 infolded and sealed together and to the side walls of the bag;

Figure 1:
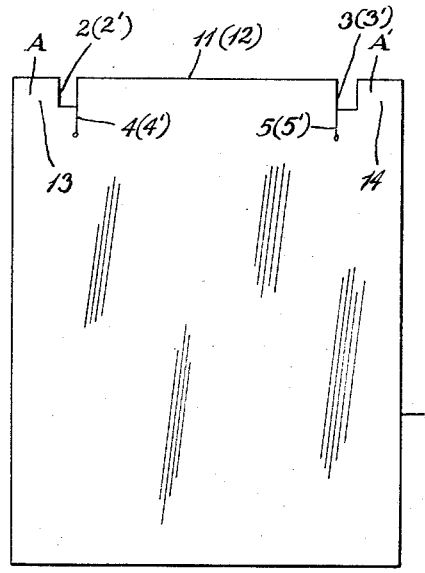

As used herein, the following terms have the following meanings: The terms "side" and "end" as used in referring to the bag walls, flaps, and tabs correspond to the sides and ends of the rectangle formed by the cross section of the bag when viewed from an end.

The term "side walls" always refers to that portion of the blank beyond the ends of the slits which form the side flaps, regardless of what portions of the blank are included in the end closure of the finished bag.

In accordance with the present invention, there is provided a bag blank of heat-sealable thermoplastic film comprising a tube having in at least one end a pair of opposed cut out portions forming opposed longitudinally protruding portions adapted to be infolded to form at least a portion of an end closure for the tube. There is also provided a thermoplastic bag made from such a blank and having at least at one end a rectangular closure comprising a pair of opposed infolded end portions and a pair of opposed infolded side portions, the infolded end and side portions being heat sealed to form the rectangular closure.

Preferred embodiments of the invention will be described in more detail by referring to the drawings.

One embodiment of the invention is illustrated in FIGS. 1-5. The bag blank shown in FIG. 1 comprises a flattened tube 10 of thermoplastic film having at its upper end two pairs of opposed similar cut out portions 2, 2' and 3, 3' and four slits 4, 4' and 5, 5' extending from the inner sides of the cut out portions longitudinally inward so as to form a pair of opposed similar side flaps 11, 12 and a pair of opposed similar end tabs 13, 14. The cut out portions form tongues A and A' on the ends of the end tabs 13 and 14, respectively. In the particular embodiment illustrated both the side flaps 11, 12 and the end tabs 13, 14 have square ends and substantially parallel sides.

Figure 2:
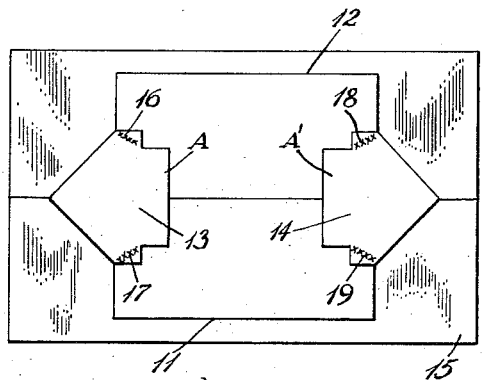
Figure 3:
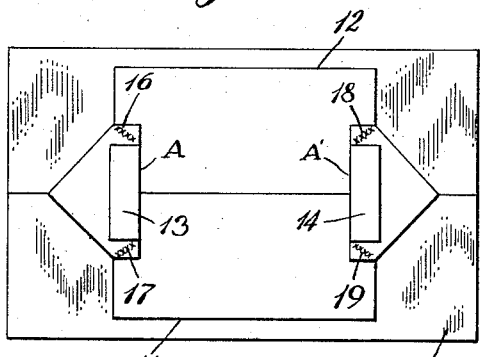
Figure 4:
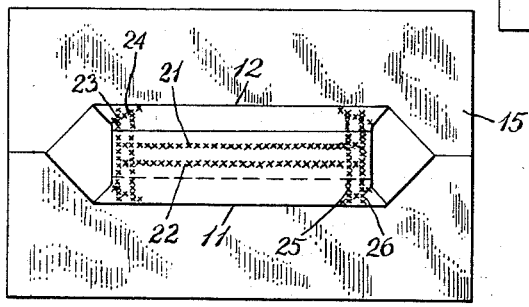
Figure 5:
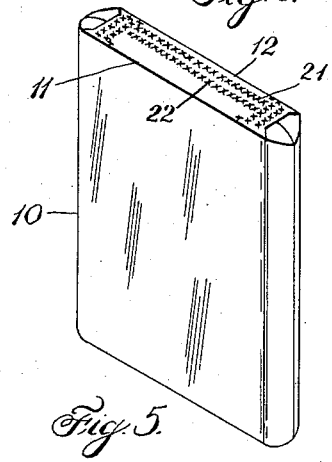

As shown in FIG. 2, the end tabs 13, 14 are first infolded and the sides thereof heat sealed to the side walls of the bag in the areas adjacent to the side flaps 11, 12 (seals 16, 17, 18, and 19). The tongues A, A' on the ends of the tabs are outfolded, as shown in FIG. 3. Referring now to FIG. 4, the side flaps 11, 12 are then infolded along with the side portions of the infolded end tabs and those portions of the side walls of the bag to which the end tabs are sealed. In other words, the side flaps are infolded along lines extending along the side edges of the tongues A, A'. The side flaps 11, 12 overlap each other when they are infolded and are sealed both to each other (seals 21 and 22) and to the tongues A, A' (seals 23, 24, 25, and 26), thus completing the end closure and forming pockets under the outfolded tongues A, A' which provide convenient hand-holds for the bag.

If desired, a valve may be formed at one corner of the bag, as described in copending United States patent application Serial No. 198,099, filed May 28, 1962. There is no need to provide a tongue on the end tab at the valve corner of the bag.

Figure 6:
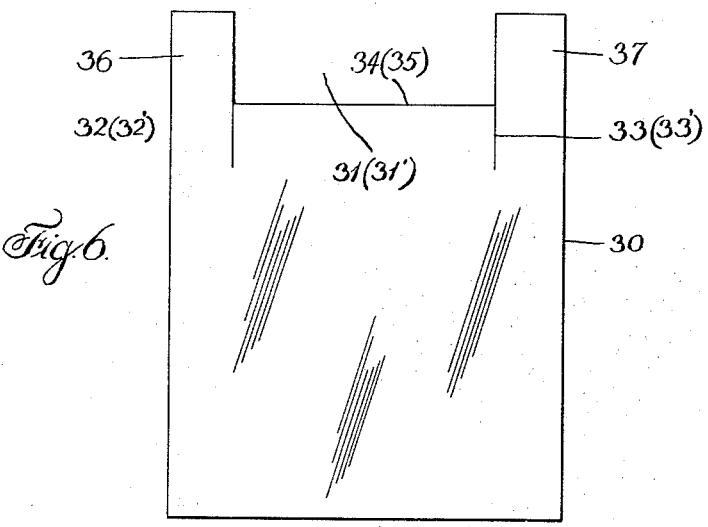
Figure 7:
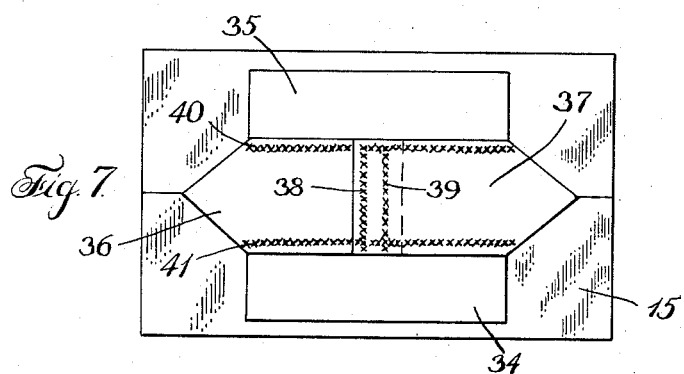
Figure 8:
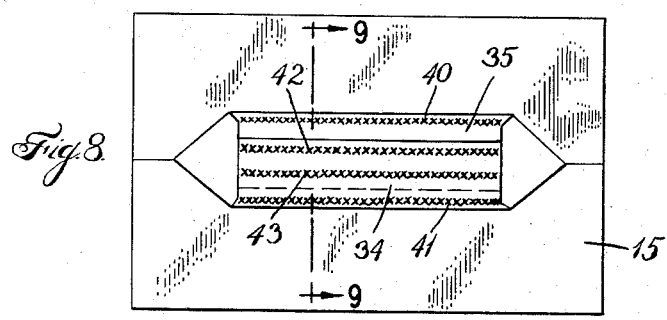
FIG. 8 is a top view of the bag blank of FIG. 7 showing the side flaps 34, 35 infolded and heat-sealed together.

Another embodiment of the invention is illustrated in FIGS. 6–8. The bag blank shown in FIG. 6 comprises a flattened tube 30 of thermoplastic film having at its upper end two opposed similar cut out portions 31, 31' and four longitudinal slits 32, 32' and 33, 33' extending longitudinally inward from the sides of the cut out portions so as to form a pair of opposed similar side flaps 34, 35 and a pair of opposed similar end tabs 36, 37. The dimensions of the cut out portions and the slits are such that the end tabs are sufficiently long to overlap each other when infolded and that the length of the side flaps is less than the width of the end tabs. In the particular embodiment illustrated, both the side flaps and the end tabs have square ends and substantially parallel sides. As shown in FIG. 7, the end tabs 36 and 37 are first infolded and sealed to each other (seals 38 and 39) and to the side walls of the bag in the areas adjacent to the side flaps 34 and 35 (seals 40 and 41). The side flaps 34 and 35 are then infolded, overlapped, and heat sealed to each other (seals 42 and 43), providing additional strength to the bag bottom and also providing a convenient handhold. As can be seen from FIG. 8, portions of the sides of the end tabs 36 and 37 and the side wall of the bag are infolded along with each side flap. In other words, each side flap is infolded along a line extending along the inner edge of the heat seal 40 or 41.

Figure 9:
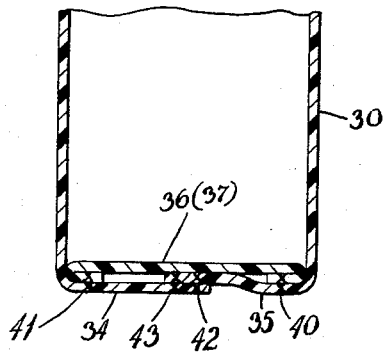
FIG. 9 is an enlarged cross-sectional view taken along line 9—9 in FIG. 8 to show the seal construction of the bag of FIG. 8.
Figure 10:
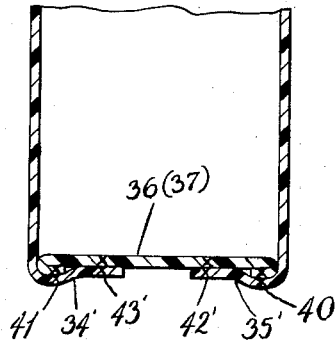
FIGS. 10 and 11 are cross-sectional views of modified seal constructions for the bag of FIG. 8.
Figure 11:
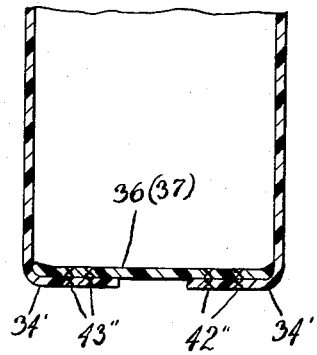

As can be seen in the cross-sectional view of FIG. 9, the infolding of those portions of the side walls and end tabs containing the seals 40 and 41 causes the load of the bag contents to be borne mainly by the seals 42 and 43, which are shear-type seals, rather than by the seals 40 and 41, which are peel-type seals. As shown in FIG. 10, this same effect can be achieved with non-overlapping side flaps 34' and 35' by sealing the flaps to the infolded end tabs 36 and 37, as by seals 42' and 43'. Another way of providing shear-type seals to bear the load of the bag contents is illustrated in FIG. 11, where the side flaps 34' and 35' are infolded along lines extending along the side edges of the end tabs 36 and 37 and sealed to the end tabs by seals 42'' and 43''; no seals are made between the end tabs and the side walls, and no portion of the end tabs or side walls are infolded.

In cases where shear-type seals are not required, the side flaps can be eliminated so that the load of the bag contents is borne solely by the peel-type seals 40 and 41 between the end tabs and side walls. The same effect is achieved by forming the closure as shown in FIGS. 7 and 8 but without infolding those portions of the side walls and end tabs containing the seals 40 and 41; the overlapping side flaps then provide a convenient handhold, but the bag load is borne by the seals 40 and 41. Other modified sealing constructions will be readily apparent to those skilled in the art.

The embodiment of FIGS. 8 and 9 is preferred not only because it puts the bag load on the shear-type seals 42 and 43 and provides additional strength and a convenient handhold, but also because it permits all the transverse seals (40, 41, 42 and 43) to be made in a single sealing operation. This can be done by infolding the side flaps and the adjacent portions of the side walls and end tabs before the seals 40 and 41 have been made (after seals 38 and 39 have been made) and then making all four transverse seals simultaneously against a back-up plate inserted over the end tabs. As can be seen in FIG. 9, the back-up plate must be inserted between the main body portions of the end tabs 36, 37 and the infolded edges thereof containing the heat seals 40 and 41.

Referring back to FIG. 7, the closure structure shown therein can be used to provide a convenient filling opening for the bag if only one or none of the heat seals 40 and 41 is made. For example, if only the heat seal 41 is made, a filling opening is provided between the overlapping end tabs 36 and 37 on the top and the side flap 35 and adjacent side wall on the bottom. It is preferred that there be no side flap adjacent the filling opening so that the opening can be closed (after the bag is filled) by folding a strip of thermoplastic film over the filling opening to form a U-shaped sealing member coextensive with the opening. One side of the U is heat sealed to the end tabs and the other side to the side walls, such as by use of a band-type sealer which heats from both sides of the U. Any seal effected between the end tabs and side walls in this operation is of the peel type and can be readily broken open, thus leaving shear-type seals between the sealing member and the side wall and the sealing member and the end tabs. Alternatively, the filling opening may be sealed by tape, sewing, an adhesive, or any other suitable sealing means. The filling opening may also be closed by sealing together the side edges of the end tabs and the adjacent portions of the side wall by any of the methods described above, such as the method illustrated in FIGS. 8 and 9.

It will be apparent that without substantial change the invention is equally applicable to other heat-sealable thermoplastic films, to multi-wall thermoplastic tubing, to seamed tubing, to pigmented or colored film, and of course to tubing of other dimensions.

As a typical example of the embodiment of FIGS. 1–5, a thirty-two inch long bag blank 10 was cut from polyethylene (density 0.920) seamless tubing of ten mil (0.010 inch thick) wall thickness and twenty-one inch flat width. Three-inch longitudinal slits were made in the top and bottom ends of the bag blank 10, three and three-quarter inches from the edge of the flattened tube, thus forming side flaps 11 and 12, each thirteen and one-half inches wide, and end tabs 13 and 14, each seven and one-half inches wide. A small hole was punched at the end of each slit to decrease the chance of tearing the tube at that point, but this may be omitted if desired. Notches were cut, one inch wide and one and one-half inches long from the end of the tube, from the end corners of tabs 13 and 14, leaving narrower tongue portions A and A' five and one-half inches wide.

The slit bag blank was gripped, six and three-quarter inches from the top end of the bag blank, in a split platen 15 (FIG. 2), the two side flaps 11 and 12 were outfolded in opposite directions onto the platen, and the two end tabs 13 and 14 were infolded onto the outfolded portions of the side walls adjacent to the side flaps, the side portions of the blank above the platen and below the tabs being folded in a "diamond" fold onto the platen 15. The sides of the end tabs 13 and 14, with the exception of the narrower tongue portions A and A', were heat-sealed (16, 17, 18, 19) to the side walls of the blank in the areas adjacent to the side flaps 11 and 12 by pressing portions of the respective flaps and tabs together by a pressure of 10 p.s.i. for about one second between the platen 15 and a conventional heat-sealing bar at a temperature in the range of 740° to 775° F.

The narrower tongue portions A and A' of the end tabs 13 and 14 were then outfolded (FIG. 3). One side flap 11 and one inch of an adjacent portion of the bag blank were infolded to make an infold of four inches, the other side flap 12 and one inch of an adjacent portion of the bag blank were infolded an equal length, overlapping the first side flap 11 by about two and one-half inches (FIG. 4). The infolding of the side flaps was done over a thin rubber-covered metal plate five and one-half inches wide (the width of the tongues A and A'), and somewhat longer than the side flaps, resting on top of the outfolded portions A and A' of the end tabs 13 and 14. The overlapping side flaps 11 and 12 were then heat-sealed together along two parallel lines (21, 22) the full length of the flaps, by pressure at 10 p.s.i. against said thin rubber-covered metal plate as a back-up plate from a conventional sealing bar at 740–775° F. for about one second. The back-up plate was then withdrawn and inserted under one and then the other of the outfolded tongue portions A and A' of the end tabs 13 and 14, and those tongue portions A and A' were heat-sealed (23, 24, 25, 26) to the infolded side flaps 11 and 12 in the same way as has been described for the earlier seals 21 and 22. This completed an end closure which was strong and provided an open-mouthed bag having a satchel bottom about five and one-half inches by about thirteen and one-half inches.

In the specific example, the other end of the bag blank 10 was dealt with precisely as just described, except that the seals 23 and 24 between the side flaps 11 and 12 and the outfolded tongue portion A of one end tab 13 were omitted, leaving a filling valve. After filling the bag, the previously omitted seals 23 and 24 may be completed if desired, or pressure of the bag contents (e.g. dry granular material) may be relied upon to close the valve.

It is obvious that the top and bottom need not be formed in the same way. For instance, an open-mouthed bag may be closed, after filling, with a simple pinched heat-seal of the flattened open end, or by sewing or cementing.

What is claimed is:

1. A heat-sealable thermoplastic bag formed from a unitary bag blank of flattened thermoplastic film tube having, at least at one end, a rectangular closure comprising, in combination, a pair of opposed, similar, infolded end tabs each having a tongue on the end thereof, which tongues are outfolded over the upper surface of their respective infolded end tabs, heat-seals at each corner of said infolded end tabs which diagonally seal said end tabs to the adjacent side walls of said bag in their common areas of overlap, a pair of similar, opposed side flaps infolded in overlapping relationship with respect to each other and to said outfolded tongues, a first pair of parallel and continuous heat-seals which seal said infolded and overlapping side flaps to each other and to the underlying, outfolded tongues in their common areas of overlap, said first pair of parallel heat-seals being substantially parallel to said side walls, and two pair of parallel heat-seals which seal said infolded and overlapping side flaps and said outfolded tongues to each other in their common areas of overlap, each pair of said two pair of parallel heat-seals being substantially transverse to said first pair of parallel heat-seals and intersecting the diagonal heat-seals at each corner of said infolded end tabs.

2. A heat-sealable thermoplastic bag formed from a unitary bag blank of flattened thermoplastic film tube having, at least at one end, a rectangular closure comprising, in combination, a pair of opposed, infolded end tabs, one of said end tabs having a tongue on the end thereof which tongue is outfolded over the upper surface of its respective, infolded end tab, heat-seals at each corner of said infolded end tabs which diagonally seal said infolded end tabs to the adjacent side walls of said bag in their common area of overlap, a pair of opposed, similar side flaps, infolded in overlapping relationship with respect to each other, to the infolded end tab having no tongue and to the infolded end tab having the outfolded tongue, a first pair of parallel and continuous heat-seals which seal said infolded side flaps to each other, to said infolded end tab having no tongue and to said outfolded tongue in their common areas of overlap, said first pair of parallel heat-seals being substantially parallel to the side walls of said bag, and two pair of parallel heat-seals, one pair of which seals said infolded and overlapping side flaps and said outfolded tongue to each other in their common areas of overlap and the other pair of which seals said infolded and overlapping side flaps and the end tab having no tongue to each other in their common areas of overlap, each pair of said two pair of parallel heat-seals being substantially transverse to said first pair of parallel heat-seals and intersecting the diagonal heat-seals at each corner of said infolded end tabs.

References Cited by the Examiner
UNITED STATES PATENTS

| | | | |
|---|---|---|---|
| 519,398 | 5/1894 | Thompson | 229—59 |
| 2,004,041 | 6/1935 | Driver | 229—57 |
| 2,346,292 | 4/1944 | Coty | 229—62.5 |
| 2,771,010 | 11/1956 | Piazze | 229—58 |
| 2,830,750 | 4/1958 | Weeks et al. | 229—62.5 |
| 2,904,241 | 9/1959 | Gorton et al. | 229—62.5 |
| 3,117,711 | 1/1964 | Camerini | 229—57 |

FOREIGN PATENTS

| | | |
|---|---|---|
| 981,487 | 1/1951 | France. |

JOSEPH R. LECLAIR, *Primary Examiner.*

EARLE J. DRUMMOND, FRANKLIN T. GARRETT,
*Examiners.*